March 12, 1963  J. H. CRANKSHAW  3,080,734
MISALIGNMENT COUPLING WITH FLEXIBLE FORCE
TRANSMITTING ASSEMBLIES
Filed July 18, 1961
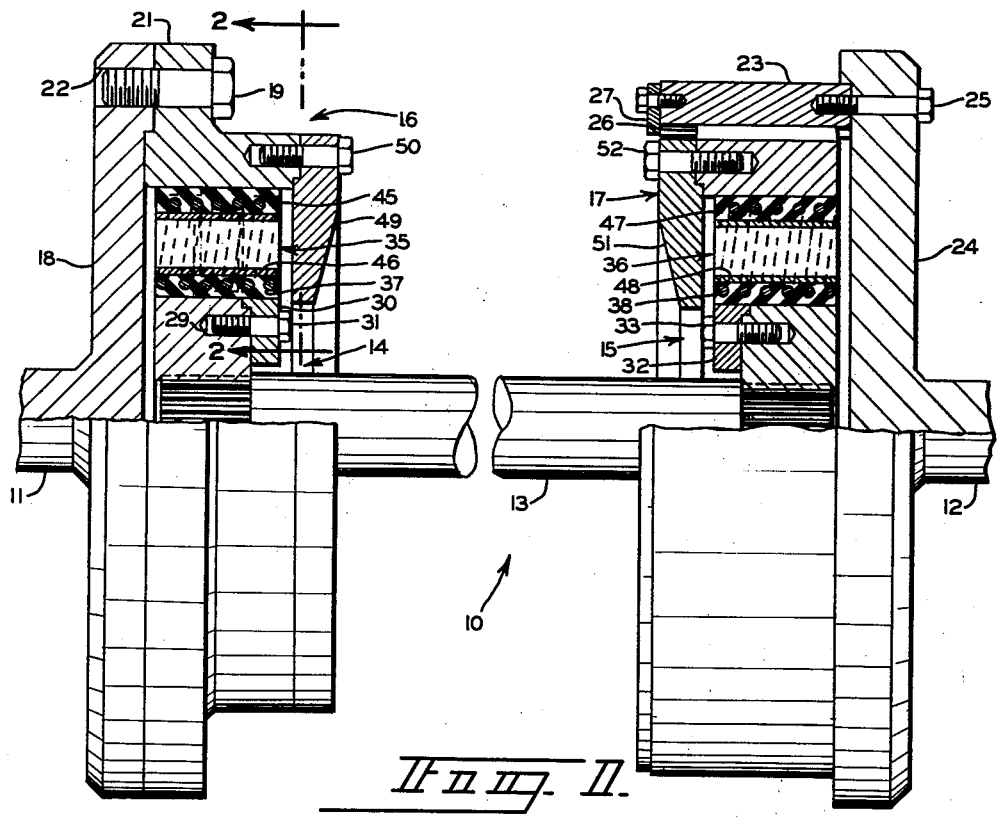
Fig. 1
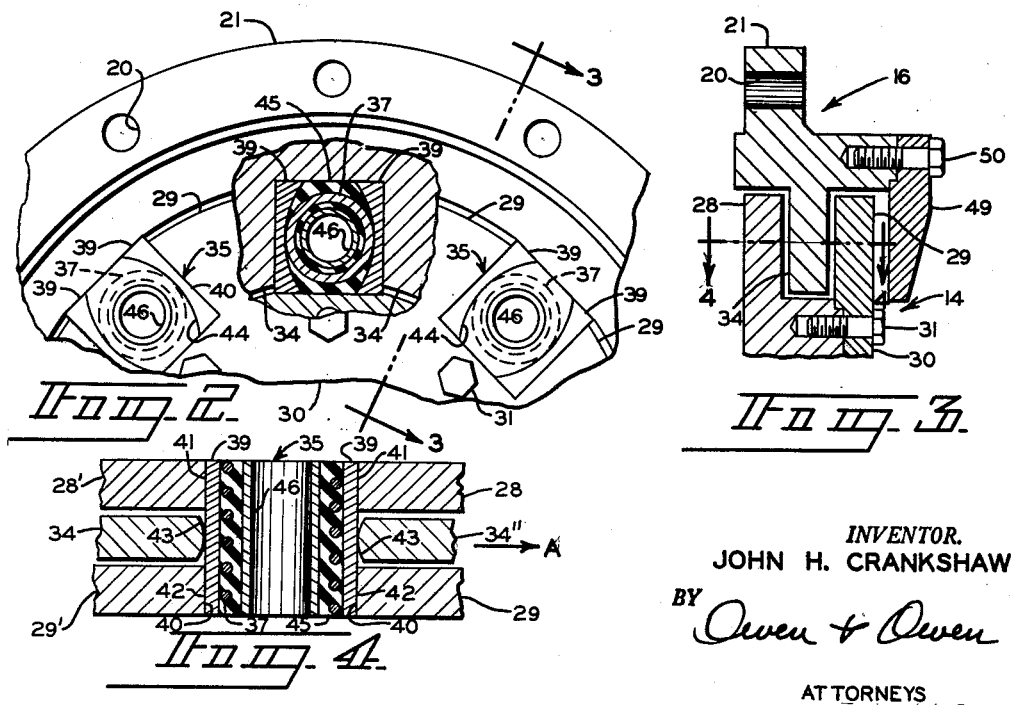
Fig. 2
Fig. 3
Fig. 4
INVENTOR.
JOHN H. CRANKSHAW
BY Owen & Owen
ATTORNEYS

United States Patent Office 3,080,734
Patented Mar. 12, 1963

3,080,734
MISALIGNMENT COUPLING WITH FLEXIBLE
FORCE TRANSMITTING ASSEMBLIES
John H. Crankshaw, Erie, Pa., assignor to Baldwin-Lima-Hamilton Corporation, Philadelphia, Pa., a corporation of Pennsylvania
Filed July 18, 1961, Ser. No. 124,988
8 Claims. (Cl. 64—15)

This invention relates to devices for connecting misaligned shafts and transmitting power therebetween. More particularly, the invention relates to misalignment couplings for connecting shafts in marine service where high torques are transmitted.

A misalignment coupling customarily includes a torque transmitting member, such as a sleeve, that is connected to one of the misaligned shafts and another torque transmitting member, such as a hub, that is connected to the other shaft, either directly or through an intermediate shaft connected thereto. Various methods are utilized to operably connect these torque transmitting members in driving relation to transmit power therebetween.

One such method is to provide force applying elements, such as meshing teeth, on the torque transmitting members. While these force applying elements produce a positive drive that is capable of transmitting high torque, lubrication of these elements is difficult because the contacting surfaces slide relative to one another during service and high surface wear is encountered. Likewise unequal tooth loadings which tend to increase tooth wear are slso encountered in couplings of this type.

Friction between these sliding surfaces produces a bending moment on each of the shafts when they are misaligned. This bending moment may cause any gears that are mounted on either of the shafts to be misaligned with the mating gears which, in turn, results in excessive gear wear.

Couplings have been proposed which include a flexible means, such as a coil spring, interposed between the torque transmitting members to distribute the loads. The flexible means is loaded either axially, as in my copending application Serial Number 76,774, filed December 19, 1960 wherein spaced springs encircle the hub, or circumferentially, as in the case where a plurality of springs are spaced around the hub with their axes substantially parallel to the axis of the hub and a load is applied tangentially to the coils of each spring from the force applying elements. The flexible means is thereby utilized to carry the load either in shear or in compression, but because the flexible means customarily slides on the force applying elements, none of these couplings makes use of the springs as a means for reducing friction between the force applying elements.

When the springs are interposed between the torque transmitting members for circumferential loading, sliding usually occurs between the peripheral surfaces of the spring coils and the contacting surfaces of the force applying elements. However, the springs may be similarly positioned but radially loaded in the case where the forces acting thereon are applied normal to the axes of the springs.

The arrangement where the springs are loaded across their axes is preferred because the springs simply distort to take up misalignment of the shafts and do not slide on the surfaces of the force applying elements during service of the coupling. However, in some couplings the springs may have a tendency to collapse, i.e. the convolutions of the spring may overlap one another.

When the springs are so positioned for radial loading, excessive wear from corrosion or "fretting" occurs along the line of contact between the spring and force applying elements on the torque transmitting members. This "fretting" is caused by repeated applications of pressure along wih very small motion which results in high unit loadings. It has been found that if air is excluded from the loaded area of the spring deterioration by "fretting" can be avoided.

It is, therefore, an object of the invention to provide a misalignment coupling which positively transmits power between misaligned shafts with a minimum of wear.

Another object of the invention is to provide a misalignment coupling that will operate satisfactorily under severe operating conditions and will function for light or heavy loads.

A further object of the invention is to provide a coupling which will transmit power from one shaft to another whether the shafts are in alignment or misaligned when the misalignment is parallel offset, angular, or both.

A still further object of the invention is to provide a misalignment coupling which utilizes a flexible means between the force applying elements thereof to reduce friction, and in which air is excluded from the space around the flexible means to prevent "fretting" corrosion.

Other and more specific objects of the invention will be apparent from the following description and from the drawings wherein like numbers are used throughout to identify like parts.

FIG. 1 is a partial axial section, partial side view, of a misalignment coupling made according to the present invention;

FIG. 2 is a partial view in elevation with parts broken away taken along the line 2—2 in FIG. 1;

FIG. 3 is a sectional view taken along the line 3—3 in FIG. 2; and

FIG. 4 is a sectional view taken along the line 4—4 of FIG. 3.

In order to achieve the objects of the invention, a misalignment coupling is provided which has at least one sleeve connected to one of the misaligned shafts together with a mating hub that is received within the bore of the sleeve and is connected to another shaft. The hub has a plurality of circumferentially spaced fingers or lugs extending outwardly from its peripheral surface, and the sleeve likewise has a plurality of equally spaced fingers or lugs extending inwardly from the peripheral surface of its bore. The lugs on the hub and sleeve are aligned in substantial juxtaposition, and the spaces between the lugs on the hub are aligned with the spaces between the lugs on the sleeve.

Power is transmitted between the hub lugs and the sleeve lugs through flexible assemblies located in the aligned spaces between these respective lugs to reduce friction and minimize wear. Each flexible assembly engages not only the hub and sleeve lugs along one of its surfaces, but also the peripherally adjacent mating lugs of the hub and sleeve along an opposed surface. Included in each of the flexible assemblies is a helical spring and a pair of rigid plates that engage opposite sides of the spring. The juxtaposed hub and sleeve lugs adjacent each plate contact an axially extending flat surface on the back of the plate and a radial force is applied to the spring from the lugs on the driving member (hub or sleeve) by the engagement of a peripheral surface of the spring with a curved surface on the front of the plate. The force is transmitted through the spring to the curved surface of the opposite plate and thence to the driven member (hub or sleeve). The springs are encapsulated in rubber to exclude air therefrom thereby preventing "fretting," and a rigid tubular member is carried within the helical spring to prevent the spring from collapsing as the radial forces are applied by the lugs through the plates.

Referring now to the drawings, there is shown in FIG. 1 a misalignment coupling 10 for transmitting mechanical power between a rotating input shaft 11 which is driven by a prime mover, such as a marine power plant, and a driven shaft 12 which is connected to a power consumer, such as a ship's propeller. In marine service, these shafts are quite large and the power transmitted may be extremely high; for example, the nominal torque rating of the shafts 11 and 12 may approach 500,000 foot-pounds. Also, high overload torques may be expected under emergency conditions.

The input shaft 11 and the output shaft 12 are normally misaligned, and misalignment may be parallel offset where these shafts are parallel but displaced from one another, or angular in which case the axes of the shafts intersect. Usually the misalignment of the input and the output shafts is combined parallel offset and angular. These shafts 11 and 12 are also considered to be axially misaligned when they shift along their axes toward and away from each other during service.

This misalignment coupling 10 is capable of accommodating combined parallel offset and angular misalignment as well as either type of misalignment individually. The coupling 10 preferably comprises an intermediate member such as a shaft 13 located between the input shaft 11 and the output shaft 12 for rotation about its normal axis. Mounted on one end of the shaft 13 is a forward hub 14 adjacent the input shaft 11 while a substantially identical hub 15 is mounted on the opposite end of the shaft 13 adjacent the output shaft 12. If desired, the hubs 14 and 15 may be formed integral with the shaft 13, or they may be made separately and rigidly mounted thereon by any convenient means such as by spline connections. The use of the intermediate shaft 13 with a coupling at each end is a recognized expedient to accommodate substantial misalignment without attempting to correct it with a single pair of mating elements.

The misalignment coupling 10 further comprises a forward sleeve 16 which receives the forward hub 14 and a rear sleeve 17 which receives the rear hub 15. The sleeve 16 is secured to the input shaft 11 in any convenient manner. For example, the input shaft 11 may be provided with an enlarged end portion 18 to which the sleeve 16 is secured by circumferentially spaced bolts 19 that pass through suitable holes 20 in a radially extending flange 21 on the sleeve 16 as shown in FIGS. 1 and 3. The bolts 19 are threadably received in mating holes 22 in the enlarged end portion 18. The sleeve 16 is very accurately mounted relative to the enlarged end portion 18 to make certain that the sleeve 16 is coaxial with the input shaft 11. This is accomplished by very accurately machining both the flat engaging surfaces and the cylindrical engaging surfaces of the sleeve 16 and the enlarged end portion 18.

As shown in FIG. 1 the rear sleeve 17 is received within an annular flange 23 that is secured to an enlarged end portion 24 of the output shaft 12 by circumferentially spaced bolts 25. The sleeve 17 is mounted in the flange 23 by a spline connection 26 which enables the sleeve 17 to shift longitudinally to accommodate axial misalignment. Movement toward the shaft 12 is limited by the enlarged end portion 24 while opposite movement is limited by a retaining ring 27 that is bolted to the forward end of the flange 23.

According to the present invention a plurality of circumferentially spaced driving fingers or lugs 28 and 29 extend outwardly from the periphery of the forward hub 14 as shown in FIGS. 2 and 3. The lugs 28 which are adjacent the enlarged end 18 of the input shaft 11 are formed integral with the hub 14 while the lugs 29 are formed on a ring member 30 that is removably secured to the hub 14 by bolts 31 which pass therethrough that are threadably received in suitably spaced holes in the hub 14. The ring 30 may be separated from the hub 14 by removing the bolts 31 to facilitate the assembly of the hub 14 within the sleeve 16.

The rear hub 15 likewise has a plurality of circumferentially spaced lugs which extend outwardly from the periphery thereof, and these lugs are substantially identical with the lugs 28 and 29 that are shown and described in connection with the forward hub 14. One set of lugs is formed integral with the rear hub 15 while a second set is formed on a ring 32 that is removably secured to the hub 15 by bolts 33 as shown in FIG. 1.

A plurality of circumferentially spaced lugs 34 extend radially inward from the bore of the sleeve 16 as shown in FIGS. 2 and 3. When the hub 14 is located in its operative position within the bore of the sleeve 16, the sleeve lugs 34 are located between the hub lugs 28 and 29 and are in substantial axial juxtaposition therewith as shown in FIGS. 2 to 4, so that a group or set of hub and sleeve lugs 28, 29 and 34 may be considered as an interdigitated group. Sufficient axial clearance is provided between the sleeve lugs 34 and the hub lugs 28 and 29 to enable the hub 14 to be skewed relative to the sleeve 16 when the shafts 11 and 12 are misaligned.

The circumferential spaces between the lugs 28 as well as the circumferential spaces between the lugs 29 on the hub 14 are aligned with the circumferential spaces between the lugs 34 on the sleeve 16. An important feature of the invention is the provision of a plurality of flexible assemblies 35 positioned in the aligned spaces between the lugs on the hub 14 and the interdigitated lugs on the sleeve 16. Flexible assemblies 36 of identical construction are located in the aligned spaces between the lugs on the hub 15 and the lugs on the sleeve 17, and the flexible assemblies 35 and 36 are utilized to reduce friction and minimize wear in the coupling 10.

Each of the flexible assemblies 35 comprises a helical spring 37 and when the flexible assemblies 35 are assembled in the coupling 10 the axes of the springs 37 are substantially parallel to the longitudinal axis of the shaft 13. As the input shaft 11 rotates the sleeve 16, power is transmitted from the lugs 34 thereon to the lugs 28 and 29 on the hub 14 through the springs 37 to rotate the shaft 13 thereby driving the hub 15 on the rear end of the coupling 10. Power is transmitted from the lugs on the hub 15 to the lugs on the sleeve 17 through springs 38 contained in the flexible assemblies 36 thereby driving the output shaft 12 that is connected to the sleeve 17.

Each flexible assembly 35 further includes a pair of opposed rigid plates 39 on opposite sides of the spring 37. Each plate 39 has a flat surface 40 on the back thereof which engages the relatively flat edges 41 and 42 of the hub lugs 28 and 29 respectively as well as the curved edge 43 on the sleeve lug 34 as shown in FIG. 4. The edge 43 is curved to enable the surface 40 to roll thereon as the sleeve 16 is skewed relative to the hub 14 when the shafts 11 and 12 exhibit angular misalignment.

When the coupling 10 is in service, rotation of the sleeve 16 forces the curved edge 43 of each sleeve lug 34 against the flat surface 40 of the adjacent plate 39 that is located along the edge of the lug 34 toward the direction of movement of the sleeve 16. This force is transmitted through the spring 37 to the opposite plate 39 thereby forcing the flat surface 40 thereof against the flat surfaces 41 and 42 of the adjacent hub lugs 28 and 29. Referring now to FIG. 4, if the hub and sleeve are moving in the direction of the arrow A, the circumferential force is transmitted from the sleeve lug 34 to the hub lugs 28 and 29 by the flexible assembly 35 while a similar force is transmitted to the hub lugs 28' and 29' by a similar sleeve lug (not shown) on the opposite side of the next preceding flexible assembly. Likewise the sleeve lug 34" loads the next flexible assembly (not shown) in the direction of the arrow A to transmit a circumferential force to the hub lugs located on the opposite side of this assembly from the hub lugs 28 and 29. The circumferential force between the sleeve lugs 34 and the hub lugs 28 and 29 is taken by elastic diametral compression of the coils in the spring 37, and if there is any relative motion between the hub and sleeve lugs in an axial direction (at right angles to the arrow A) due to misalignment of the hub and sleeve, each plate 39 will move in an axial direction with whichever lug or lugs being forced against the surface 40 thereof. As the plates 39 shift relative to each other in the axial direction, each coil of the spring 37 turns about its radial axis.

The front surface 44 of each plate 39 is curved in order that the unit contact stress caused by the forces applied to the springs 37 from the lugs 28, 29 and 34 may be reduced. The radius of curvature of each surface 44 is larger than the outside radius of the helical spring 37, and the greater the radius of curvature of the surface 44 the greater the contact stress with the coils of the spring 37. While it would appear desirable that the radius of the curvature of the surface 44 be nearly the same as the outside radius of the spring 37, this is not true. The contact between the coils of the spring 37 and the surface 44 becomes a sliding contact rather than a desirable rolling contact as the radius of curvature of the surface 44 approaches the outside radius of the spring 37 because the increased surface contact between the spring 37 and the surface 44 prevents the spring coils from tilting about their radial axes. Thus the present invention departs from the prior art by utilizing a relatively large radius of curvature for the facing surfaces 44 of the plates 39 considered with respect to the outside radius of the spring 37. Rolling contact between these engaging elements is thus assured.

Still another feature of the invention is the encapsulation of each spring 37 in rubber 45 as shown in FIGS. 1 and 2. Corrosion or "fretting" of the coils of each spring 37 is prevented by the rubber 45 which excludes air from the spring coils. While the portion of the rubber 45 at the point of closest approach between each spring 37 and the curved surfaces 44 of the adjoining contoured plates 39 may crush away during service, air is excluded from the remainder of the spring 37 by the rubber 45 to insure corrosion free operation.

Still another feature of the invention is the provision of a rigid tubular member 46 that is freely supported within the coils of each helical spring 37. The tubular members 46 prevent the convolutions of the springs 37 from overlapping one another during service and thereby prevent the springs 37 from collapsing as the radial forces are applied to the springs 37 through the plates 39.

The spring 38 of each flexible assembly 36 is likewise encapsulated in rubber 47 as shown in FIG. 1. A tubular member 48 which is identical with the tubular member 46 is likewise freely carried within the coils of the spring 38 to prevent the spring from collapsing during service.

Endwise movement of the flexible assembly 35 toward the input shaft 11 is limited by the enlarged end portion 18. Similar movement in the opposite direction is limited by an annular retaining ring 49 that is removably secured to the sleeve 16 by bolts 50. A similar retaining ring 51 is removably secured to the sleeve 17 by bolts 52.

While the misalignment coupling of the invention has been illustrated in its preferred embodiment, it will be appreciated that various modifications to the structure of this coupling may be made without departing from the spirit of the invention or the scope of the subjoined claims.

I claim:

1. A coupling for transmitting power between a pair of shafts having misaligned axes, said coupling comprising an intermediate member interposed between the misaligned shafts, said intermediate member being rotatable about its longitudinal axis, first members mounted on opposite ends of said intermediate member for rotation about said longitudinal axis, second members spaced from said first members and connected to the misaligned shafts, flexible means positioned between said first and second members for transmitting power therebetween, said flexible means comprising a plurality of helical springs having their respective axes substantially parallel to said longitudinal axis, interdigitated lugs on said first and second members for transmitting power between said helical springs and said first and second members, and a substantially elongated member interposed between each of said lugs and its respective helical spring, said elongated member having a curved inner surface for rolling engagement with the outer peripheral surface of said helical spring.

2. A coupling for transmitting power between a pair of shafts having misaligned axes, said coupling comprising an intermediate member interposed between the misaligned shafts, said intermediate member being rotatable about its longitudinal axis, first members mounted on opposite ends of said intermediate member for rotation about said longitudinal axis, second members spaced from said first members and connected to the misaligned shafts, flexible means positioned between said first and second members for transmitting power therebetween, said flexible means comprising a plurality of circumferentially spaced helical springs each having its axis substantially parallel to said longitudinal axis, spaced interdigitated lugs on each of said first and second members for applying radial forces to said springs, elongated members interposed between said springs and said lugs, each of said elongated members having a curved surface for rolling engagement with an adjacent spring, and a substantially rigid member receivable within each of said springs for supporting said spring as said radial forces are applied by said elements.

3. A coupling for transmitting power between a pair of shafts having misaligned axes, said coupling comprising an intermediate member interposed between misaligned shafts, said intermediate member being rotatable about its longitudinal axis, first members mounted on opposite ends of said intermediate member for rotation about said longitudinal axis, second members spaced from said first members and connected to the misaligned shafts, flexible means positioned between said first and second members for transmitting power therebetween, said flexible means comprising a plurality of circumferentially spaced helical springs having their respective axes substantially parallel to said longitudinal axis, spaced interdigitated lugs on each of said first and second members for applying forces substantially normal to the axis of each of said springs, means for exluding air from each of said springs, and a substantially elongated member interposed between each of said force applying elements and the adjacent spring, each of said elongated members having a curved surface for engaging said adjacent spring with a rolling action, the radius of curvature of said curved surface being substantially greater than the outside radius of said adjacent spring.

4. In a misalignment coupling of the type having a first member connected to a shaft and a second member connected to another shaft for transmitting torque between said shafts; the improvement comprising a plurality of springs interposed between the first and second members for transmitting power between said members, a plurality of juxtaposed lugs on said members for applying radial forces to said springs, and a plurality of elongated members interposed between said springs and said lugs, each of said elongated members having a curved surface for engagement with the outer peripheral surface of one of said springs adjacent thereto.

5. In a misalignment coupling of the type having a first member connected to a shaft and a second member connected to another shaft for transmitting torque between said shafts; the improvement comprising a plurality of springs interposed between said members for transmitting power therebetween, interdigitated force applying elements on each of said first and said second members for applying radial forces to said springs, elongated members interposed between said springs and said force applying elements, each of said elongated members having a curved surface for rolling engagement with an adjacent spring, and a rigid member receivable within each of said springs for supporting said spring as said radial forces are applied by said elements.

6. In a misalignment coupling of the type having a first member connected to a shaft and a second member connected to another shaft for transmitting torque between said shafts; the improvement comprising a plurality of helical springs interposed between said members for transmitting power therebetween, force applying elements on each of said first and second members for applying forces substantially normal to the axis of each of said springs, means for excluding air from each of said springs, and an elongated member interposed between each of said force applying elements and the adjacent spring, each of said elongated members having a curved surface for engaging said adjacent spring with a rolling action, the radius of curvature of each of said elongated members being substantially greater than the radius of said adjacent spring.

7. In a misalignment coupling of the type having a hub connected to a shaft and positioned in the bore of a sleeve connected to another shaft; the improvement comprising a plurality of first spaced lugs extending outwardly from the periphery of the hub, a plurality of second spaced lugs extending inwardly from the bore of the sleeve in substantial juxtaposition with said first lugs, said first lugs being aligned with said second lugs with the spaces between said first lugs aligned with the spaces between said second lugs, a plurality of flexible members positioned within said aligned spaces between said first and second lugs, each member extending into one of the spaces between said first lugs and one of the spaces between said second lugs, and a plurality of rigid members for engagement with said first and second lugs for applying forces to said flexible members, each of said rigid members engaging one of said flexible members for transmitting a force normal thereto and between said first and second lugs.

8. In a misalignment coupling as defined in claim 7, in which said flexible members comprise helical springs positioned within the aligned spaces between the first and second lugs, and in which each of said rigid members has curved surfaces in engagement with the outer peripheral surfaces of said springs, the radius of curvature of each of said curved surfaces being greater than the radius of each of said helical springs, to enlarge the area on which the force is transmitted to said springs and to assure rolling deflection of the spring coils upon axial displacement thereof.

References Cited in the file of this patent

UNITED STATES PATENTS

| | | |
|---|---|---|
| 1,324,523 | Serrell | Dec. 9, 1912 |
| 1,595,864 | Francke | Aug. 10, 1926 |
| 2,958,213 | Donner | Nov. 1, 1960 |
| 2,987,332 | Bonmartini | June 6, 1961 |

OTHER REFERENCES

Grabmann et al.: German application Serial No. 1,037,-213 published August 21, 1958 (1 sheet dwg., 1 page spec.), 64–9R.